United States Patent
Kato et al.

[11] Patent Number: 6,071,210
[45] Date of Patent: Jun. 6, 2000

[54] TROIDAL-TYPE CONTINUOUSLY VARIABLE TRANSMISSION AND A BALL SPLINE FOR USE IN THE SAME

[75] Inventors: Hiroshi Kato; Hisashi Machida; Takashi Imanishi; Nobuo Goto; Makoto Fujinami, all of Kanagawa, Japan

[73] Assignee: NSK Ltd., Tokyo, Japan

[21] Appl. No.: 09/189,933

[22] Filed: Nov. 12, 1998

[30] Foreign Application Priority Data

Nov. 11, 1997 [JP] Japan ................................... 9-308606
Dec. 24, 1997 [JP] Japan ................................... 9-354459

[51] Int. Cl.$^7$ .............................. F16H 15/26; F16C 29/04
[52] U.S. Cl. .............................. 476/42; 384/49; 464/167; 476/40
[58] Field of Search .............................. 384/49; 464/167, 464/168; 476/40, 42

[56] References Cited

U.S. PATENT DOCUMENTS

| | | | |
|---|---|---|---|
| 5,027,669 | 7/1991 | Nakano | 476/42 |
| 5,190,378 | 3/1993 | Tanaka | 384/49 |
| 5,299,988 | 4/1994 | Fukushima et al. | 476/42 |
| 5,362,156 | 11/1994 | Hara | 384/45 |
| 5,569,112 | 10/1996 | Fukushima | 476/40 |

FOREIGN PATENT DOCUMENTS 8-4869   1/1996   Japan .
9-88988  3/1997   Japan .

Primary Examiner—Allan D. Herrmann
Attorney, Agent, or Firm—Sughrue, Mion, Zinn, Macpeak & Seas, PLLC

[57] ABSTRACT

The ball spline for use in a troidal-type continuously variable transmission comprises a plurality of spline grooves and a plurality of balls which are arranged in series within spline gaps each constituted by a set of mutually opposing spline grooves, in which, while allowing the movement of the input disc in the direction of an input shaft by means of contact between the spline gaps and balls, the input shaft and input disc can be drivingly connected to each other. In the ball spline, the number of spline gaps is set different from integral multiples of the number of power rollers which are held by and between the input and output discs in contact with the two discs in order to transmit a rotation torque between the input and output discs. Further, each of the spline grooves includes inner and outer peripheral surface side spline grooves, and the shape of each of the sections of the two inner and outer peripheral surface side spline grooves respectively forming the ball spline is formed as a Gothic arch shape. And, the radius of curvature of the section of the groove bottom portion arc surface forming the groove bottom portion of each of the spline grooves is set more than or equal to 15% of the diameter of the ball. Also, the outer peripheral surface side chamfers of the outer peripheral surface side spline groove are set smaller to thereby be able to secure the effective grinding surface of the outer peripheral surface side spline groove.

10 Claims, 11 Drawing Sheets

TROIDAL-TYPE CONTINUOUSLY VARIABLE TRANSMISSION AND A BALL SPLINE FOR USE IN THE SAME

BACKGROUND OF THE INVENTION

1. Field of the Invention

The present invention relates to a troidal-type continuously variable transmission and a ball spline for use in the troidal-type continuously variable transmission which is used as a transmission for an automobile and, in more particular, to such ball spline which is mounted in a connecting portion between an input shaft and an input disc to drivingly connect them together.

2. Description of the Related Art

A troidal-type continuously variable transmission, which has been conventionally studied mainly as a transmission for an automobile, comprises at least one set of troidal-type transmission mechanism which comprises a combination of input and output discs, the mutually opposing surfaces of which respectively have an arc-shaped concave section, and a plurality of power rollers respectively held rotatably by and between these input and output discs. The input disc is secured to and mounted on an input shaft in such a manner that it can be rotated integrally with the input shaft and is limited in the movement thereof in the input shaft direction, whereas the output disc is mounted on the input shaft in such a manner that it can rotated relatively to the input shaft and is limited in the movement thereof in a direction it moves away from the input disc.

In the troidal-type transmission mechanism of the above-mentioned type, if the input disc is rotated, then the output disc is rotated reversely through the power rollers and, therefore, a rotational movement to be input into the input shaft is transmitted to the output disc and is taken out therefrom as a reversed-direction rotational movement. In this operation, the inclination angles of the rotary shafts of the power rollers are caused to vary in such a manner that the peripheral surfaces of the power rollers can be contacted with the neighboring portion of the outer periphery of the input disc and the neighboring portion of the center of the output disc, thereby increasing the speed of rotation from the input shaft to an output gear; and, on the contrary to this, the inclination angles of the rotary shafts of the power rollers are caused to vary in such a manner that the peripheral surfaces of the power rollers can be contacted with the neighboring portion of the center of the input disc and the neighboring portion of the outer periphery of the output disc, thereby decreasing the speed of rotation from the input shaft to the output gear. Further, in the case of an intermediate transmission ratio between the above-mentioned speed increasing and decreasing cases as well, by adjusting the inclination angles of the rotary shafts of the power rollers properly, the transmission speed can be changed almost in a continuously variable manner.

Also, between the input-disc-direction end portion of the input shaft and the input disc, there is interposed a loading cam device which is capable of increasing or decreasing a pressing force in the input shaft direction according to the intensity of the input torque; that is, the loading cam device is capable of adjusting a frictional force produced between the input disc and power rollers as well as between the power rollers and output disc in such a manner that the frictional force can always provide a proper intensity. Further, in order to operate the loading cam device effectively, the input disc is driven and connected to the input shaft in such a manner that the movement of the input disc in the input shaft direction is allowed.

Such driving connection is realized, for example, by providing a ball spline in a connecting surface between the input disc and input shaft, while the ball spline comprises a plurality of spline gaps and a plurality of balls respectively arranged in series in their corresponding spline gaps. The spline gaps comprise a plurality of spline grooves which are respectively formed in the inner wall surface of a mounting hole opened up in the center of the input disc and in the outer peripheral surface of the input shaft in such a manner that they are located along the input shaft direction and are opposed to each other; in particular, one set of mutually opposing spline grooves serve as a spline gap corresponding to a line of balls. Also, the respective spline grooves are formed as linear-shaped recessed portions each having a hemi-circular section and, in the input shaft section, they are arranged at regular intervals in the circumferential direction of the input shaft.

FIGS. 8 and 9 show one example of the aforementioned troidal-type continuously variable transmission as a transmission for an automobile. In the illustrated conventional troidal-type continuously variable transmission, an input disc 42 is supported coaxially with an input shaft 41 which is rotatably supported in the interior portion of a transmission case (not shown), and an output disc 44 is fixed to the end portion of an output shaft 43 which, similarly to the input shaft 41, is rotatably supported in the transmission case. A support bracket is disposed either on the inner surface of the transmission case in which the troidal-type continuously variable transmission is stored or in the interior portion of the present transmission case; and, in the support bracket, there are provided two trunnions 5 and 5 which can be respectively swung about their respective pivots situated at positions twisted with respect to the input and output shafts 41 and 43.

These trunnions 5 and 5 are respectively formed of metal material having sufficient rigidity, while the pivots are disposed on the outside surfaces of the two end portions thereof in such a manner that they extend in the front and back direction of FIGS. 8 and 9 are arranged concentric with each other. Also, in the respective central portions of the trunnions 5 and 5, there are provided shift shafts 6 and 6, while power rollers 7 and 7 are rotatably supported in the respective peripheries of the shift shafts 6 and 6, respectively. And, the power rollers 7 and 7 are held by and between the input and output discs 42 and 44. On the respective one-side surfaces of the input and output discs 42 and 44 in the axial direction thereof which are opposed to each other, there are respectively formed an input side concave surface 42a and an output side concave surface 44a each having a section of an arc shape with a point on its corresponding pivot as a center thereof. And, the peripheral surfaces 7a and 7a of the power rollers 7 and 7, which are respectively formed as convex surfaces each having a rotation arc surface shape, are contacted with the input side concave surface 42a and output side concave surface 44a, respectively.

Also, between the input shaft 41 and input disc 42, there is interposed a loading cam type of pressing device 8 (that is, a loading cam device) and thus the input disc 42 is pressed toward the output disc 44 by the pressing device 8. The pressing device 8 comprises a cam plate 9 rotatable together with the input shaft 41, and a plurality of (for example, four pieces of) rollers 11, 11 respectively held by a cage 10 in a freely rotatable manner. On one side surface (in FIGS. 8 and 9, on the right side surface) of the cam plate 9, there is formed a cam surface 12 consisting of a concavo-convex surface extending in the circumferential direction of the cam plate 9; and, at the same time, on the outside surface (in FIGS. 8 and 9, on the left side surface) of the input disc 42, there is formed a similar cam surface 13. And, the plurality of rollers 11, 11 are arranged such that they can be freely rotated about their respective shafts extending in the radial direction with respect to the center of the input shaft 41. By the way, the input disc 42 is supported in such a manner that it can be moved to a slight extent in the axial direction of the input shaft 41 and also it can be freely rotated in the rotation direction of the input shaft 41.

If the cam plate 9 is rotated due to the rotational movement of the input shaft 41 to thereby generate a rotation phase difference with respect to the input disc 42, then the plurality of rollers 11, 11 roll up onto the two cam surfaces 12 and 13 to thereby move the cam plate 9 and input disc 42 away from each other. Because the cam plate 9 is supported on the input shaft 41 carried through a bearing on the transmission case in such a manner that the cam plate 9 is prevented from moving in the axial direction of the input shaft 41, the input disc 42 is pressed toward the power rollers 7, 7, while these power rollers 7, 7 are thus pressed toward the output disc 44. On the other hand, the output disc 44 is carried on the transmission case in such a manner that it can be only rotated together with the output shaft 43 but is prevented against movement in the axial direction of the output shaft 43. For this reason, the power rollers 7, 7 are held strongly by and between the input and output discs 42 and 44. Due to this, the contact pressures between the peripheral surfaces 7a, 7a of the power rollers 7, 7 and the two input side and output side concave surfaces 42a, 44a are raised to a sufficient degree. As a result of this, the rotational movement of the input disc 42 can be smoothly transmitted to the output disc 44 through the power rollers 7, 7 to thereby be able to rotate the output shaft 43 to which the output disc 44 is fixed.

Referring here to an operation for changing a rotation speed ratio between the input and output shafts 41 and 43, at first, when reducing the rotation speed between the input and output shafts 41 and 43, as shown in FIG. 8, the trunnions 5 and 5 are respectively swung about the above-mentioned pivots in a given direction to thereby incline the above-mentioned shift shafts 6 and 6 in such a manner that the peripheral surfaces 7a, 7a of the respective power rollers 7, 7 can be contacted with the portion of the input side concave surface 42a to the center thereof as well as with the portion of the output side concave surface 44a to the outer periphery thereof. On the other hand, when increasing the rotation speed, as shown in FIG. 9, the trunnions 5 and 5 are respectively swung in the opposite direction to the above-mentioned given direction to thereby incline the above-mentioned shift shafts 6 and 6 in such a manner that the peripheral surfaces 7a, 7a of the respective power rollers 7, 7 can be contacted with the portion of the input side concave surface 42a to the outer periphery thereof as well as with the portion of the output side concave surface 44a to the center thereof. Also, if the inclination angles of the shift shafts 6 and 6 are set halfway between FIGS. 8 and 9, then an intermediate rotation speed change ratio can be obtained.

The basic structure and operation of a troidal-type continuously variable transmission are as described above. By the way, when such troidal-type continuously variable transmission is used as a transmission for an automobile including an engine of a large output, in order to be able to secure the power that can be transmitted, it is proposed that the above-mentioned input and output discs 42 and 44 are provided two by two. That is, in the troidal-type continuously variable transmission of a so called double cavity type, the two input discs 42 and two output discs 44 are arranged parallel to each other in the power transmission direction. Here, FIG. 10 shows an embodiment of a conventional troidal-type continuously variable transmission of a so called double cavity type which is developed so as to attain such object.

In the conventional structure shown in FIG. 10, an input shaft 15, which is a rotary shaft, is supported in the interior portion of a housing 14 in such a manner that only the rotation of the input shaft 15 is allowed. The input shaft 15 comprises a front half section 15a to be connected to the output shaft of a clutch or the like, and a rear half section 15b which is allowed to rotate to a slight degree with respect to the front half section 15a. And, a pair of input discs 42 and 42 are respectively supported on the two end portions of the rear half section 15b in the axial direction thereof through ball splines 16 and 16 in such a manner that their respective input side concave surfaces 42a and 42a are disposed opposed to each other. Also, in the central portions of the back surfaces of the two input discs 42 and 42 (that is, the surfaces of the input discs 42 and 42 that are located on the opposite side of the input side concave surfaces 42a and 42a of the input discs 42 and 42 in the axial direction thereof), there are respectively formed recessed portions 17 and 17. There is disposed a coned disc spring 20 between the deep-side surface of the recessed portion 17 and the loading nut 18. And there is also disposed another coned disc spring 20 between the deep-side surface of the recessed portion 17 and the securing stepped portion 19 which is formed on the outer peripheral surface of the front half section 15a. That is, pre-loads to be directed to output discs 44 and 44 (which will be discussed below) are respectively applied to the two input discs 42 and 42 by the present coned disc springs 20 and 20. In this example, two coned disc springs are provided, however, one of them can be omitted.

In the periphery of the middle portion of the rear half section 15b, the pair of output discs 44 and 44 are supported rotatable with respect to the rear half section 15b in such a manner that their output side concave surfaces 44a and 44a are respectively opposed to the input side concave surfaces 42a and 42a. Also, the plurality of power rollers 7, 7 (see FIGS. 8 and 9), which are rotatably supported on the plurality of trunnions 5, 5 through the shift shafts 6, 6, are held by and between the input side and output side concave surfaces 42a and 44a. Further, in the interior portion of the housing 14 that is located between the pair of output discs 44 and 44, there is formed a partition 21. And, in the interior portion of a through hole 22 formed in the partition 21, a circular-tube-shaped sleeve 24 is supported by a pair of ball-and-roller bearings 23 and 23 which are respectively ball bearings of an angular type. The pair of output discs 44 and 44 are spline engaged with the two end portions of the sleeve 24 such that they can be freely rotated together with the sleeve 24. Also, an output gear 25 is fixedly provided in the middle portion of the sleeve 24 that is located in the interior portion of the partition 21. On the other hand, in the interior portion of the housing 14, there is rotatably supported an output shaft 26 in parallel to the input shaft 15. And, a gear 27 fixed to one end (in FIG. 10, the left end) of the output shaft 26 is meshingly engaged with the output gear 25 so that the rotational movements of the pair of output discs 44 and 44 can be freely taken out. Further, between the front half section 15a and one (in FIG. 10, the left one) of the input discs 42, there is interposed a pressing device 8 of a loading cam type, whereby, as the input shaft 15 is rotated, the present (one) input disc 42 can be freely driven or rotated, while pressing the same in the axial direction of the input shaft 15, toward the output disc 44 to which the present one input disc 42 is opposed.

In the troidal-type continuously variable transmission having the above-mentioned structure, with the rotational movement of the input shaft 15, the pair of input discs 42 and 42 are rotated simultaneously, the rotational movements of the input discs 42 and 42 are transmitted to the pair of output discs 44 and 44 simultaneously, and the rotational movements of the output discs 44 and 44 are transmitted to the output shaft 26 and are then taken out therefrom. In this transmission, since the transmission of the rotational forces is made by means of two systems which are parallel to each other, a high level of power (torque) can be transmitted.

When the power is transmitted from the input shaft 15 to the output shaft 26, the input and output discs 42 and 44 as well as the power rollers 7, 7 (see FIGS. 8 and 9), which are held by and between the input and output discs 42 and 44, are elastically deformed due to a large thrust load which is generated by the pressing device 8. This elastic deformation can be absorbed by the shifting operations of the input discs 42 and 42; that is, as they are shifted with respect to the rear half section 15b of the input shaft 15 in the axial direction thereof. Because the input discs 42 and 42 are supported on the rear half section 15b by the ball splines 16 and 16 in such a manner that they are free to shift in the axial direction of the rear half section 15b, the above-mentioned absorption of the elastic deformation can be achieved smoothly. Also, due to the fact that the shift shafts 6 and 6 (see FIGS. 8 and 9) respectively comprising eccentric shafts and supporting the power rollers 7, 7 pivotally are swung about circular holes (not shown) respectively formed in the trunnions 5, 5, the power rollers 7, 7 are also caused to shift in the axial direction of the rear half section 15b to thereby be able to absorb the above-mentioned elastic deformation. However, such absorption of the elastic deformation based on the swinging shift movements of the shift shafts 6, 6 is conventionally known and does not relate to the characteristic portion of the present invention and, therefore, the detailed illustration and description thereof are omitted here. Next, description will be given below of the structure of the ball spline 16 portion of the invention, which relates to the characteristic portion of the present invention, with reference to not only FIG. 10 but also FIGS. 11 and 12.

In order to structure the ball splines 16, in the respective inner peripheral surfaces of the input discs 42 and 42, there are formed inner peripheral surface side spline grooves 28 and 28 in such a manner that they extend in the axial direction of the input discs 42 and 42; and, in the outer peripheral surface portions of the rear half section 15b that are located to the two end portions thereof, there are formed outer peripheral surface side spline grooves 29 and 29 in such a manner that they extend in the axial direction of the rear half section 15b. And, between the mutually corresponding spline grooves 28 and 29 each having a substantially hemi-arc-shaped section, there are interposed a plurality of balls 30, 30, whereby the input discs 42 and 42 are combined with the rear half section 15b of the input shaft 15 in such a manner that they can be freely shifted in the rotational force transmission direction as well as in the axial direction thereof. Also, in the respective opening edges of the two circumferential-direction ends of the inner peripheral surface side spline grooves 28 and 28, there are provided inner peripheral surface side chamfers 31 and 31; and, in the respective opening edges of the two circumferential-direction ends of the outer peripheral surface side spline grooves 29 and 29, there are provided outer peripheral surface side chamfers 32 and 32. Further, the rear half section 15b of the input shaft 15 is formed as a circular tube; in the central portion of the rear half section 15b, there is formed an oil supply passage 33; the oil supply passage 33 is branched outwardly in the diameter direction of the rear half section 15b to thereby provide branch oil supply passages 34, 34; and, the downstream ends of the branch oil supply passages 34, 34 are respectively opened in the groove bottom portions of the outer peripheral surface side spline grooves 29 and 29. By the way, in the branch oil supply passages 34, 34 (in the illustrated embodiment, the branch oil supply passage 34 situated on the pressing device 8 side), the inside diameter side half section thereof is formed in such a manner as to have a small diameter, whereas the outside diameter side half section thereof is formed in such a manner as to have a large diameter. The reason for employment of this structure is that it is necessary to make the inside diameter small in order to control the flow rate of the oil, whereas the length of the small diameter portion difficult to machine must be shortened to thereby facilitate the machining of the small diameter portion.

By the way, referring to the relation between the inside diameter $R_2$ of the portions of the inner peripheral surfaces of the input discs 42 and 42 that are shifted from the inner peripheral surface side spline grooves 28 and 28 and the outside diameter $D_{15b}$ of the portions of the outer peripheral surface of the rear half section 15b that are shifted from the outer peripheral surface side spline grooves 29 and 29, regardless of the working tolerances of the respective peripheral surfaces, the inside diameter $R_2$ is set larger than the outside diameter $D_{15b}$ (that is, $R_2 > D_{15b}$) so that gaps (clearances) can be produced between the respective peripheral surfaces. Therefore, the alignment of the input discs 42 and 42 with respect to the rear half section 15b (an operation to align the axes of the input discs 42 and 42 with the axis of the rear half section 15b) must be made on the basis of the spline grooves 28, 29. Also, the input side concave surfaces 42a and 42a of the input discs 42 and 42 must be worked on the basis of the inner peripheral surface side ball splines 28, 28.

By the way, when the input disc is rotated while it is in contact with the power rollers, due to the strong pressing force given from the loading cam device, the input disc is in part deformed, while the direction and rate of this deformation varies according to the positions of the power rollers along the circumferential direction thereof. For example, the portions of the input disc located in the same phase with the power rollers (that is, the contact points of the respective power rollers) are expanded toward the outside diameter direction thereof, whereas the portions of the input disc corresponding to the intermediate phase of the contact points of the two mutually adjoining power rollers are contracted toward the inside diameter direction thereof.

Here, FIG. 3 shows an example of an input disc which is incorporated into a troidal-type continuously variable transmission including two power rollers. FIG. 3 is a view obtained when the input disc 1 is viewed from its contact surface side with respect to the two power rollers and, in the center portion of the input disc 1, there is opened up a mounting hole 2 through which an input shaft can be inserted. Also, the input disc 1 is to be contacted with the two power rollers at its two left and right contact points 3 and 3 which are respectively designated by reference characters circled +. If a strong pressing force is applied to the thus structured input disc 1 from the loading cam device, then loads acting on and around the contact points 3 and 3 of the input disc 1 with the two power rollers are caused to increase partially, with the result that the contour of the input disc 1, which has been in such a complete circle as shown by a solid line in FIG. 3 before it is deformed, is stretched out in the left and right directions and is thereby deformed into such a shape as shown by a broken line, that is, an elliptical shape which is long from side to side.

Also, FIG. 4 similarly shows an example of an input disc which is incorporated into a troidal-type continuously variable transmission including three power rollers. In this case, the input disc 1 is to be contacted with the three power rollers at its three contact points 3, 3, and 3 which are respectively located on the upper side, lower right side, and lower left side of the input disc 1 and designated by reference characters circled + in FIG. 4. If a strong pressing force is applied to the thus structured input disc 1 from the loading cam device, then loads acting on and around the contact points 3, 3, and 3 of the input disc 1 with the three power rollers are caused to increase partially, with the result that the contour of the input disc 1, which has been in such a complete circle as shown by a solid line in FIG. 4 before it is deformed, is stretched out in the upper direction, in the lower left direction and in the lower right direction and is thereby deformed into such a shape as shown by a broken line in FIG. 4.

If the input disc 1 is deformed in this manner, then the distance of a gap between the outer peripheral surface of the input shaft and the inner wall surface of the mounting hole 2 of the input disc 1 is caused to increase or decrease partially. For this reason, when the ball spline provided on the contact surface between the input shaft and input disc 1 overlaps with the deformed area of the input disc 1 due to the loading cam device, some of the spline gaps respectively formed by the plurality of spline grooves can have such a distance that is deviated from a proper distance which is provided in the normal state of the input disc 1. For example, in the portions of the input disc 1 which are located in the same phase with the power rollers (that is, its contact points with the respective power rollers) and also in which the input disc 1 is expanded, the distance of the spline gaps is enlarged when compared with the proper value; and, on the other hand, in the portions of the input disc 1 which are located in the intermediate phase with the two mutually adjoining power rollers and also in which the input disc 1 is contracted, the distance of the spline gaps is reduced when compared with the proper value.

If the input disc 1 is contacted to thereby cause the distance of the spline gaps to become smaller than the diameter of each of the balls arranged in series within the spline gaps, then the loads acting on the respective balls located within the distance-reduced spline gaps are caused to increase, which in turn causes an excessive surface pressure on these balls. As a result of this, the increasing ball rotation load not only interferes with the movement of the ball spline in the input shaft direction to thereby lower the transmission efficiency of the whole troidal-type continuously variable transmission, but also causes the balls to strike the spline grooves so as to leave impressions thereon, or causes the balls to roll up onto the spline grooves so that the ball spline can be broken easily. Especially, when the number N of the spline gaps of the ball spline is integral multiples of the number Np of the power rollers, the same number of spline gaps as the number Np of the power roller, which is the greatest common measure between the numbers N and Np, are situated at the same time in the greatest contracted portion of the input disc 1 (that is, the intermediate phase portion of the contact points of the input disc 1 with the two power rollers), so that the above-mentioned transmission efficiency lowering tendency and breakage rate increasing tendency are both strengthened further.

For example, in FIG. 5 which shows a case where six pieces of spline grooves 4 are formed at regular intervals in the input disc 1 which is shown in FIG. 3 and with which the two power rollers are to be contacted, since the input disc 1 is deformed from a shape shown by a solid line in FIG. 5 to a shape shown by a dotted line shown in FIG. 5, out of the six regularly spaced spline grooves 4, for the two grooves 4a and 4a which are respectively situated on the top and bottom sides of the input disc 1, the inside diameter of the mounting hole 2 is most greatly reduced. As a result of this, the spline gaps that are formed by these top and bottom side spline grooves 4a and 4a are narrowed in the distance thereof, so that the loads acting on the balls arranged within these spline grooves are both caused to increase. Also, in FIG. 6 as well which shows a case where six pieces of spline grooves 4 are formed at regular intervals in the input disc 1 which is shown in FIG. 4 and with which the three power rollers are to be contacted, similarly, according to the deformation of the input disc 1, out of the six regularly spaced spline grooves 4, for the three spline grooves 4b, 4b and 4b which are respectively situated on the upper left side, upper right side and bottom side of the input disc 1, the inside diameter of the mounting hole 2 is most greatly reduced. As a result of this, the spline gaps that are formed by these upper left side, upper right side and bottom side spline grooves 4b, 4b and 4a are narrowed in the distance thereof, so that the loads acting on the balls arranged within these spline grooves are all caused to increase.

Further, in the conventional troidal-type continuously variable transmission which is structured and operated in the above-mentioned manner, for the following two reasons (1) and (2), it is difficult to increase a transmissible torque between the rotary shaft of the rear half section 15b or the like and input discs 42, 42 while securing the durability thereof. That is:

(1) Concentrated application of stresses onto the groove bottom portions of the spline grooves 28 and 29 respectively formed on the inner and outer peripheral surface sides of the transmission cannot be relieved to a sufficient degree and, therefore, if a large torque is transmitted, then there is a possibility that damages such as cracks and the like can be caused at and from the groove bottom portions.

(2) The contact ellipses in the contact portions between the two circumferential-direction side surfaces of the inner and outer surface side spline grooves 28, 29 and the rolling surfaces of the balls 30, 30 cannot be increased, so that the surface pressures applied to the contact portions are caused to increase. For this reason, if large torque transmission is carried out, then it is difficult to secure a rolling fatigue life between the two circumferential-direction side surfaces of the inner and outer surface side spline grooves 28, 29 and the rolling surfaces of the balls 30, 30.

Next, description will be given below in more detail of the above-mentioned reasons or problems (1) and (2).

Reasons for the Problem (1)

In order to secure a contact angle between the inner surfaces of the inner and outer surface side spline grooves 28, 29 and the rolling surfaces of the balls 30, 30 to thereby secure the rigidity and load capacity of the ball spline 16 in the rotation direction thereof, the spline grooves 28, 29 must be formed in such a manner as to have a section of such a Gothic arch shape as shown in FIG. 13 exaggerated in the diameter direction. That is, the spline grooves 28, 29 must be formed respectively in such a manner that two side surface portion arc surfaces 35 and 35 each having a radius of curvature larger than the radius of curvature of the above-mentioned rolling surface are continuously connected to each other through a groove bottom portion 36. On the other hand, during the operation of the troidal-type continuously variable transmission, due to pressing forces applied to the inner surfaces of the inner and outer surface side spline grooves 28, 29 from the balls 30, 30, a tensile stress is applied to the groove bottom portion 36. Also, in the case of the inner peripheral surface side spline groove 28, due to a thrust load applied to the circumferential-direction portion of the input disc 42 from the power roller, the inner peripheral surface of the input disc 42 is deformed into an elliptic shape, which increases the above-mentioned tensile stress still further. If the radius of curvature of the section of the groove bottom portion 36 is small, there is produced a possibility that a damage such as a crack or the like can be caused in the groove bottom portion 36 by the aforementioned tensile stress applied repeatedly; that is, such small radius curvature provides an obstacle to securing the durability of the troidal-type continuously variable transmission.

Reasons for the Problem (2)

In order to lower the surface pressures applied to contact portions between the two circumferential-direction side surfaces of the inner and outer surface side spline grooves 28, 29 and the rolling surfaces of the balls 30, 30 to thereby secure the rolling fatigue life between the two circumferential-direction side surfaces of the inner and outer surface side spline grooves 28, 29 and the rolling surfaces of the balls 30, 30, it is preferred that the contact ellipses of the contact portions may be increased in size. On the other hand, to increase the contact ellipses, it is necessary to widen the mutually opposing areas between the two circumferential-direction side surfaces of the inner and outer surface side spline grooves 28, 29 and the rolling surfaces of the balls 30, 30. In particular, effective grinding surfaces, which are included in the inner surfaces of the inner and outer surface side spline grooves 28, 29 and are ground so that the rolling surfaces of the balls 30, 30 can be contacted therewith, must be enlarged; in more particular, the length of the sections of such effective grinding surfaces extending in the peripheral direction thereof must be enlarged.

To cope with this, in the above-mentioned conventional structure, the inner peripheral surface side chamfers 31 and 31 respectively formed in the respective opening edges of the two circumferential-direction ends of the inner peripheral surface side spline grooves 28 and 28 are formed equal in size to the outer peripheral surface side chamfers 32 and 32 respectively formed in the respective opening edges of the two circumferential-direction ends of the outer peripheral surface side spline grooves 29 and 29. Therefore, the peripheral-direction length $L_{29}$ of the section of the effective grinding surface of the outer peripheral surface side spline groove 29 formed in the outer peripheral surface of the rear half section 15b providing a convex surface is smaller than the peripheral-direction length $L_{28}$ of the section of the effective grinding surface of the inner peripheral surface side spline groove 28 formed in the inner peripheral surface of the input disc 42 providing a concave surface (that is, $L_{29}<L_{28}$). As a result of this, the above-mentioned contact ellipse cannot be made to approach the opening of the outer peripheral surface side spline groove 29 to a satisfactory degree and, if there is secured a contact angle between the inner surface of the present outer peripheral surface side spline groove 29 and the rolling surface of the ball 30, then the contact ellipse cannot be made to increase in size to a satisfactory degree.

SUMMARY OF THE INVENTION

The present invention aims at eliminating the drawbacks found in the above-mentioned conventional ball splines. Accordingly, it is an object of the invention to provided a troidal-type continuously variable transmission and a ball spline for use in the troidal-type continuously variable transmission, in which, when an input disc is deformed due to a pressing force from power rollers, by reducing the number of spline gaps that apply the greatest loads onto balls, the troubles and transmission loss of the ball spline caused by the excessive surface pressure on the balls can be reduced.

Further, it is another object of the invention to provide a troidal-type continuously variable transmission and a ball spline for use in the troidal-type continuously variable transmission which can eliminate one or both of the above-mentioned causes (1) and (2) that impede compatibility between the secureness of a transmission torque and enhancement in durability.

According to a first aspect of the invention, there is provided a ball spline for use in a troidal-type continuously variable transmission, comprising: a plurality of spline grooves respectively formed in an outer peripheral surface of an input shaft and in an inner wall surface of a mounting hole opened up in a central portion of an input disc in such a manner that they extend along a direction of the input shaft and are opposed to each other, thereby forming spline gaps by two mutually opposing spline grooves respectively formed in the outer peripheral surface of the input shaft and in the inner wall surface of the mounting hole of the spline grooves; and a plurality of balls arranged in series within the spline gaps, wherein, while allowing a movement of the input disc in the direction of the input shaft by means of contact between the spline gaps and the balls, the input shaft and the input disc are drivingly connected to each other, wherein the number of the spline gaps is set different from integral multiples of the number of power rollers which are held by and between the input disc and an output disc in contact with the two discs in order to transmit a rotation torque between the input and output discs.

Preferably, the number of the spline gaps and the number of the power rollers are mutually prime to each other According to a second aspect of the present invention, there is provided a ball spline for a troidal-type continuously variable transmission, wherein a disc is supported through a the ball spline on an outer peripheral surface of a rotary shaft so as to be freely shifted in an axial direction of the rotary shaft, the ball spline comprising: a plurality of first spline grooves respectively formed in an inner peripheral surface of the disc; a plurality of second spline grooves respectively formed in the outer peripheral surface of the rotary shaft, wherein the first spline glooves and the second spline grooves respectively extend along a direction of the rotary shaft and are opposed to each other respectively, thereby forming a plurality of spline gaps; and a plurality of balls arranged in series within the spline gaps, wherein each of the first spline grooves and the second spline grooves comprises: two side surface arc portions respectively formed on two circumferential-direction inner surfaces of the first spline groove and the second spline groove, each of the side surface arc portions having a larger radius of curvature than a radius of curvature of a rolling surface of the ball; a bottom arc surfaces formed on a bottom portion of the first spline groove and the second spline groove, wherein the bottom arc surface has a radius of curvature which is smaller than the radius of curvature of the rolling surface of the ball and is 0.15 or more times an outside diameter of the ball, so that the first spline groove and the second spline groove have a cross section of a Gothic arch shape, and after execution of heat treatment on the first spline grooves and the second spline grooves, heat-treated abnormal layers are removed from a surface of each of the bottom portions of the first spline grooves and the second spline grooves.

Since the radius of curvature of the section of the groove bottom portion of each of the spline grooves respectively formed on the inner peripheral surface side of one of the discs and on the outer peripheral surface side of the rotary shaft of the present transmission is 0.15 or more times the outside diameter of the ball, a damage such as a crack or the like is difficult to occur in the groove bottom portion regardless of the tensile stress applied to the groove bottom portion due to the pressing force which is applied from the balls to the respective inner surfaces of the above-mentioned inner and outer peripheral surface side spline grooves. Also, in the present groove bottom portion, there is not present any abnormal layer which is caused through execution of heat treatment on the spline grooves, so that the damage prevention of the groove bottom portion can be attained more effectively.

According to a third aspect of the invention, there is provided a ball spline for a troidal-type continuously variable transmission, wherein a disc is supported through a the ball spline on an outer peripheral surface of a rotary shaft so as to be freely shifted in an axial direction of the rotary shaft, the ball spline comprising: a plurality of first spline grooves respectively formed in an inner peripheral surface of the disc, each of the first spline grooves having two first chamfers respectively formed in circumferential-direction two end opening edge portions of the first spline groove; a plurality of second spline grooves respectively formed in the outer peripheral surface of the rotary shaft, each of the second spline grooves having two second chamfers respectively formed in circumferential-direction two end opening edge portions of the second spline groove, wherein the first spline glooves and the second spline grooves respectively extend along a direction of the rotary shaft and are opposed to each other respectively, thereby forming a plurality of spline gaps; and a plurality of balls arranged in series within the spline gaps, wherein the second chamfers are set smaller than the first chamfers.

Since the outer peripheral surface side chamfers are set smaller than the inner peripheral surface side chamfers, the peripheral-direction length of the section of the effective grinding surface of the outer peripheral surface side spline groove can be secured by an amount corresponding to the above reduction. As a result of this, not only the contact angle between the outer peripheral surface side spline groove and the balls can be secured but also the necessary size of the contact ellipse can be secured, thereby being able to secure the rolling fatigue life between the inner surfaces of the outer peripheral surface side spline groove and the rolling surfaces of the balls.

DETAILED DESCRIPTION OF THE PREFERRED EMBODIMENTS

In a ball spline according to the invention, the number N of spline gaps and the number Np of power rollers to be contacted with an input disc are set in such a manner that the number N is not integral multiples of the number Np. As a result of this, even in a condition where a pressing force is applied from the power rollers to an input disc to thereby deform the input disc, the phase of the deformed area of the input disc always overlaps with positions in which spline grooves are formed only at the same number of points as the greatest common measure between the numbers N and Np and, for this reason, the number of spline gaps, the distances of which are reduced greatly from a proper value, becomes at least half of the number Np or less. That is, the number of balls on which the greatest loads are applied is reduced greatly when compared with the conventional ball spline, which makes it possible to restrict the troubles and transmission loss of the ball spline caused by the excessive surface pressure on the balls to a minimum. Also, due to the reduced number of balls with the greatest loads applied thereto, loads to be applied to the respective spline grooves can be equalized, so that the upper limit of the load tolerance of the ball spline can be set lower than that of the conventional ball spline.

Especially, when the number N of spline gaps and the number Np of power rollers to be contacted with the input disc are set in such a manner that they are mutually prime to each other, since the greatest common measure between the numbers N and Np is always 1, the phase of the deformed area of the input disc overlaps with the spline groove formation positions always at one point and, therefore, the number of lines of balls with the greatest loads applied thereto is one. Due to this, the troubles and transmission loss of the ball spline caused by the excessive surface pressure on the balls can be reduced greatly when compared with the conventional ball spline.

Figure 1:
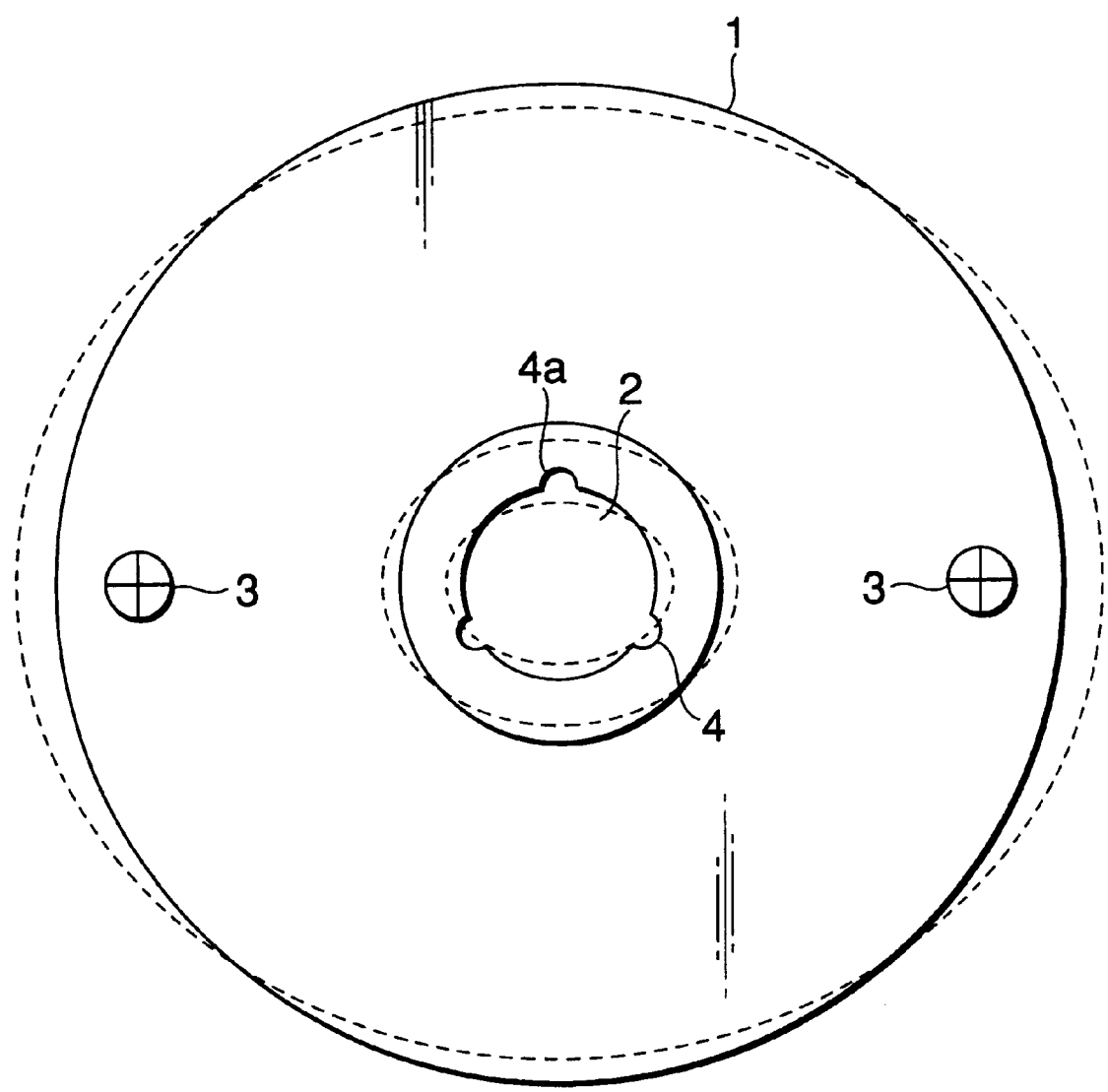
FIG. 1 is a front view an embodiment of an input disc employed in a ball spline for use in a troidal-type continuously variable transmission according to the invention, in which there are formed spline grooves used to constitute spline gaps.
Figure 3:
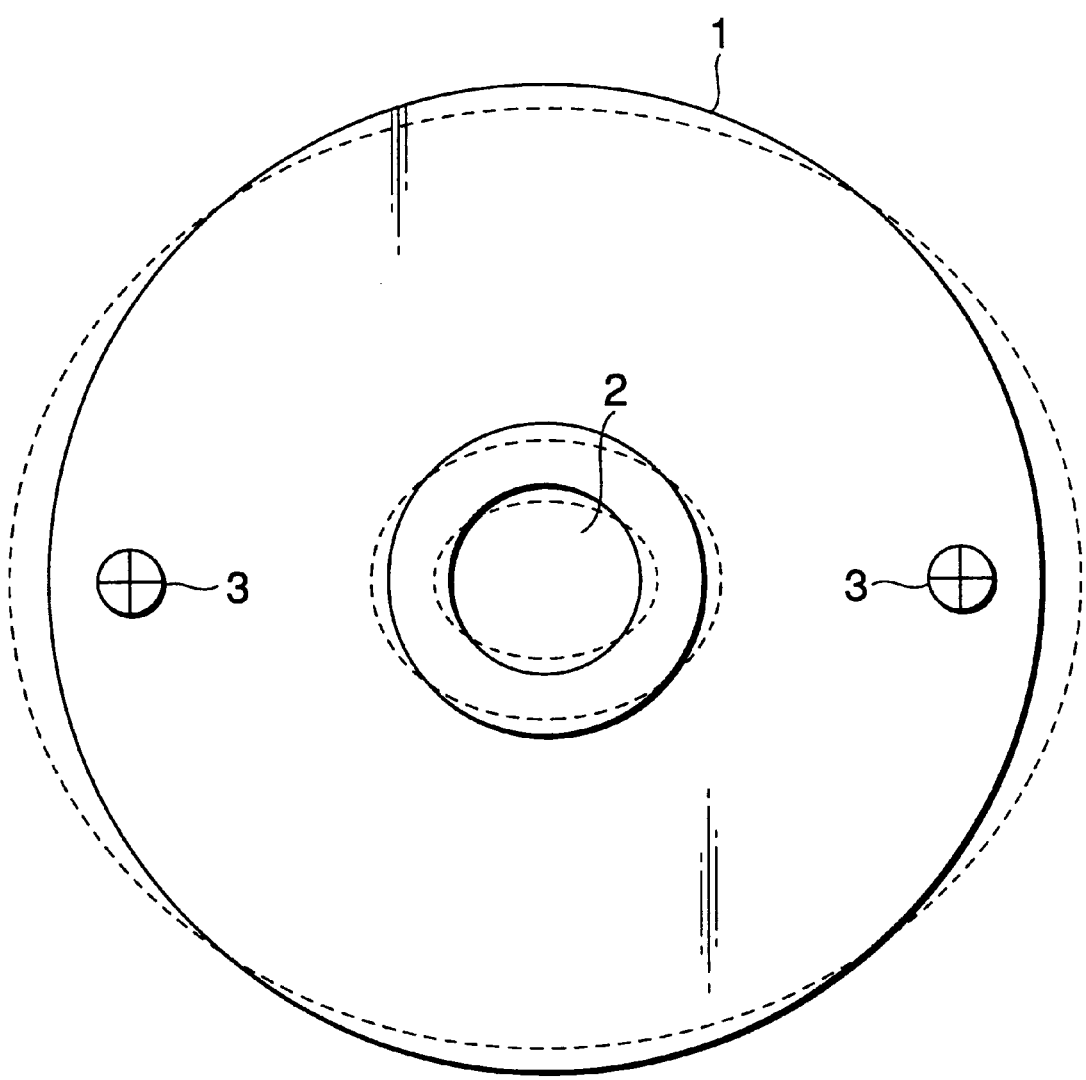
FIG. 3 is a front view of an input disc to be incorporated into a troidal-type continuously variable transmission including two power rollers, showing how the input disc is deformed.

Now, FIG. 1 shows an embodiment of an input disc employed in a ball spline for use in a troidal-type continuously variable transmission according to the invention, in which there are formed spline grooves used to constitute spline gaps. In the present input disc, the other remaining elements thereof than the number of spline grooves are similar in structure to those of the conventional input disc with spline grooves formed therein. With the present input disc 1 as well, similarly to FIG. 3, two power rollers are respectively contacted with the input disc 1 at the left and right contact points 3 and 3 thereof. Also, the number of spline grooves 4, which are formed in the inner wall surface of the mounting hole 2 of the input disc 1 at regular intervals, is three. Therefore, even when the input disc is deformed due to a pressing force from the power rollers and is thereby turned from such a complete circular shape as shown by a solid line in FIG. 1 to an elliptic shape which is long from side to side as shown by a dotted line, the spline gap, which is allowed to overlap with the phase of the input disc 1 where the inside diameter of the mounting hole 2 is reduced most greatly, is only the spline gap that is constituted by the upper side spline groove 4a.

Figure 2:
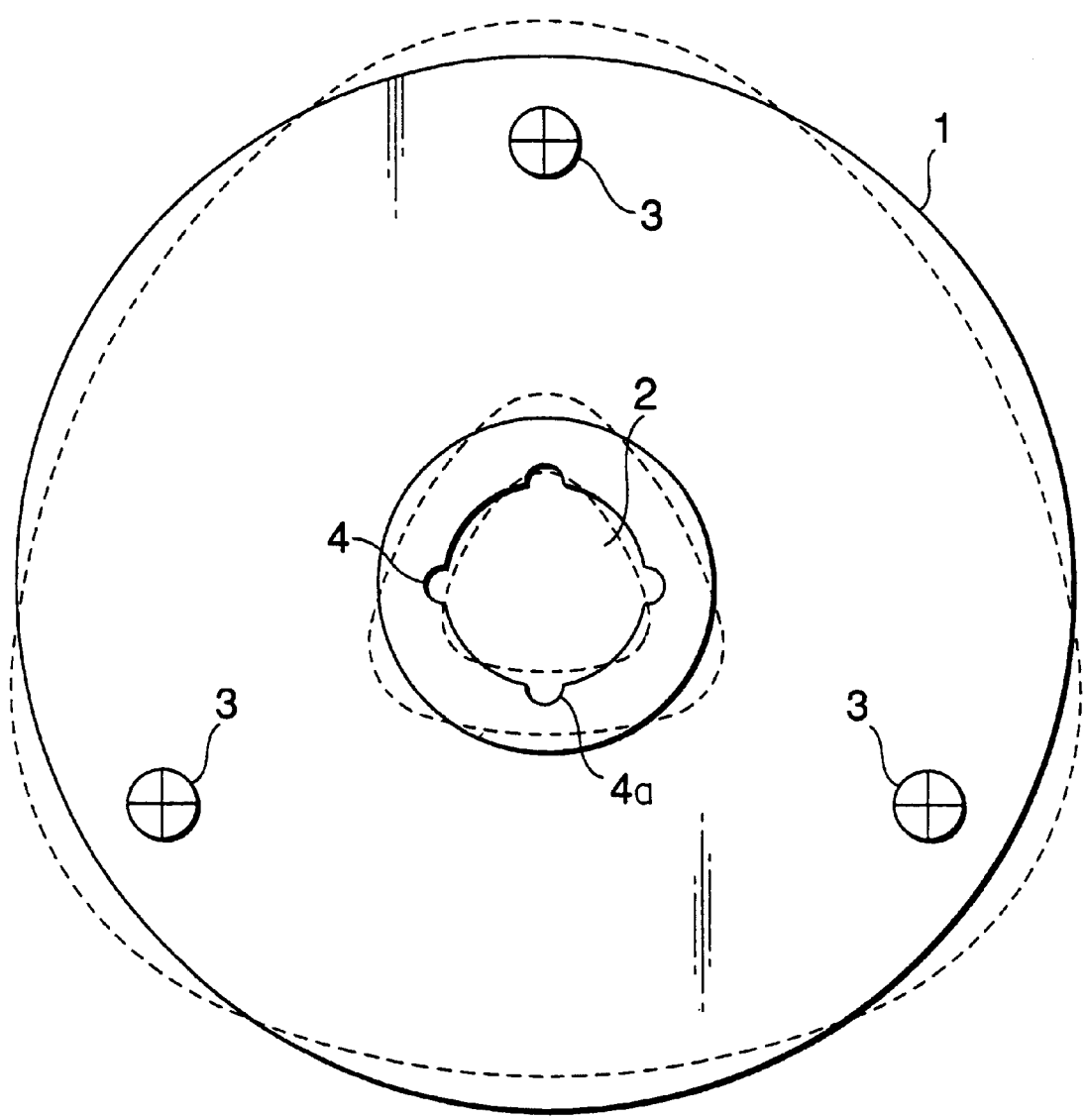
FIG. 2 is a front view of another embodiment of an input disc employed in a ball spline for use in a troidal-type continuously variable transmission according to the invention, in which there are formed spline grooves used to constitute spline gaps.
Figure 4:
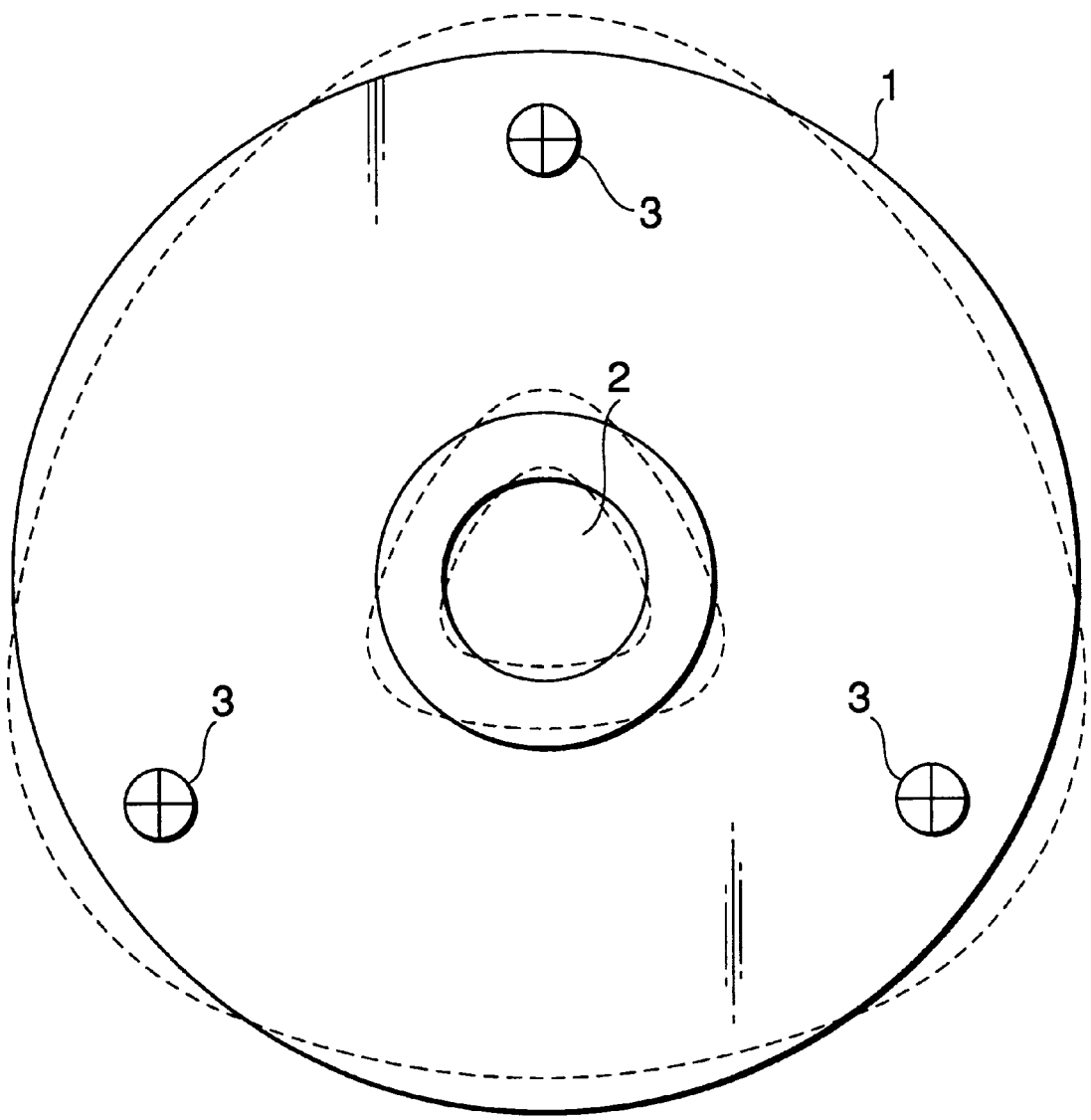
FIG. 4 is a front view of an input disc to be incorporated into a troidal-type continuously variable transmission including three power rollers, showing how the input disc is deformed.
Figure 5:
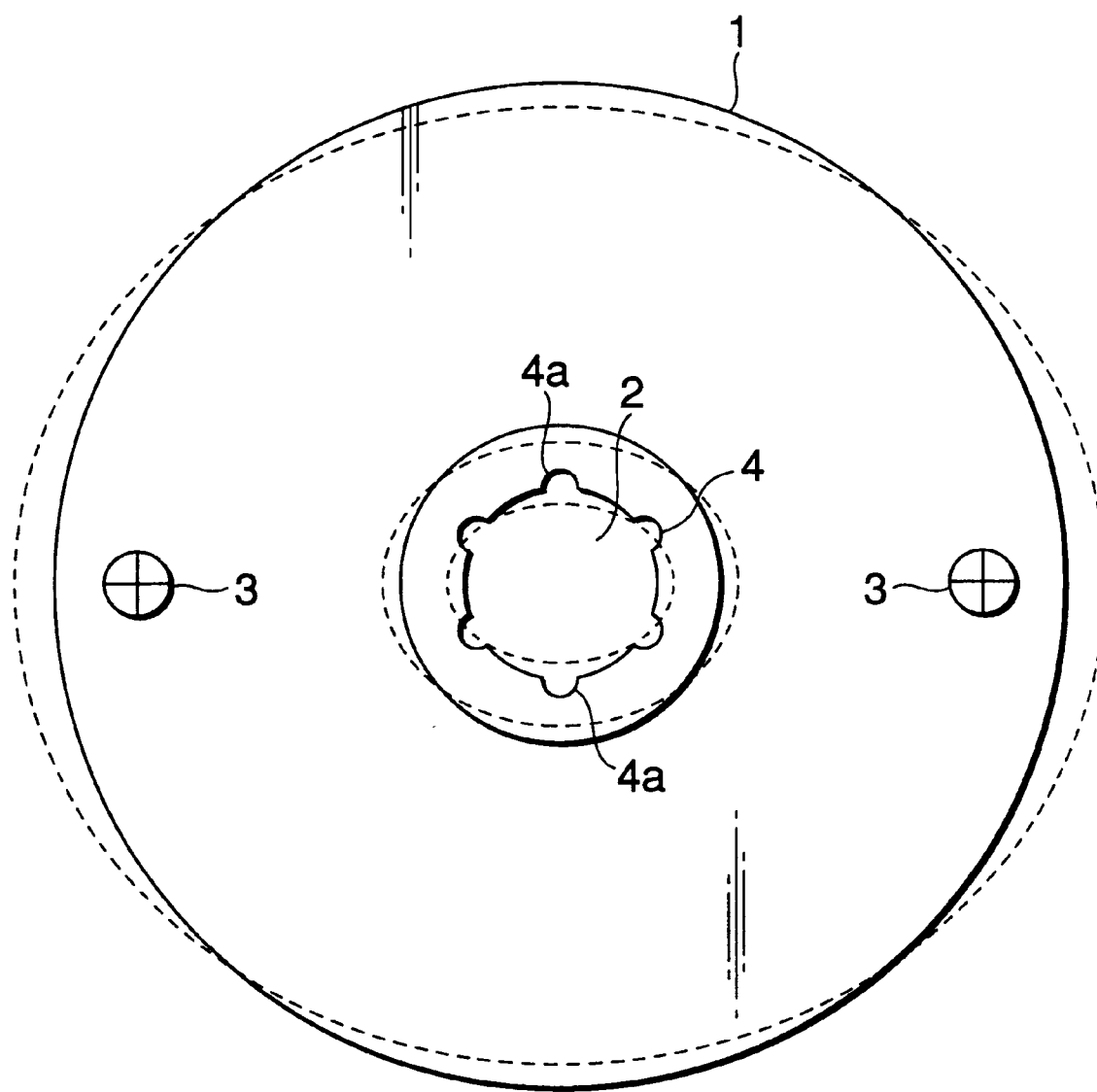
FIG. 5 is a front view of an input disc with which the two power rollers shown in FIG. 3 can be contacted, showing an embodiment of the input disc in which six spline grooves are formed.
Figure 6:
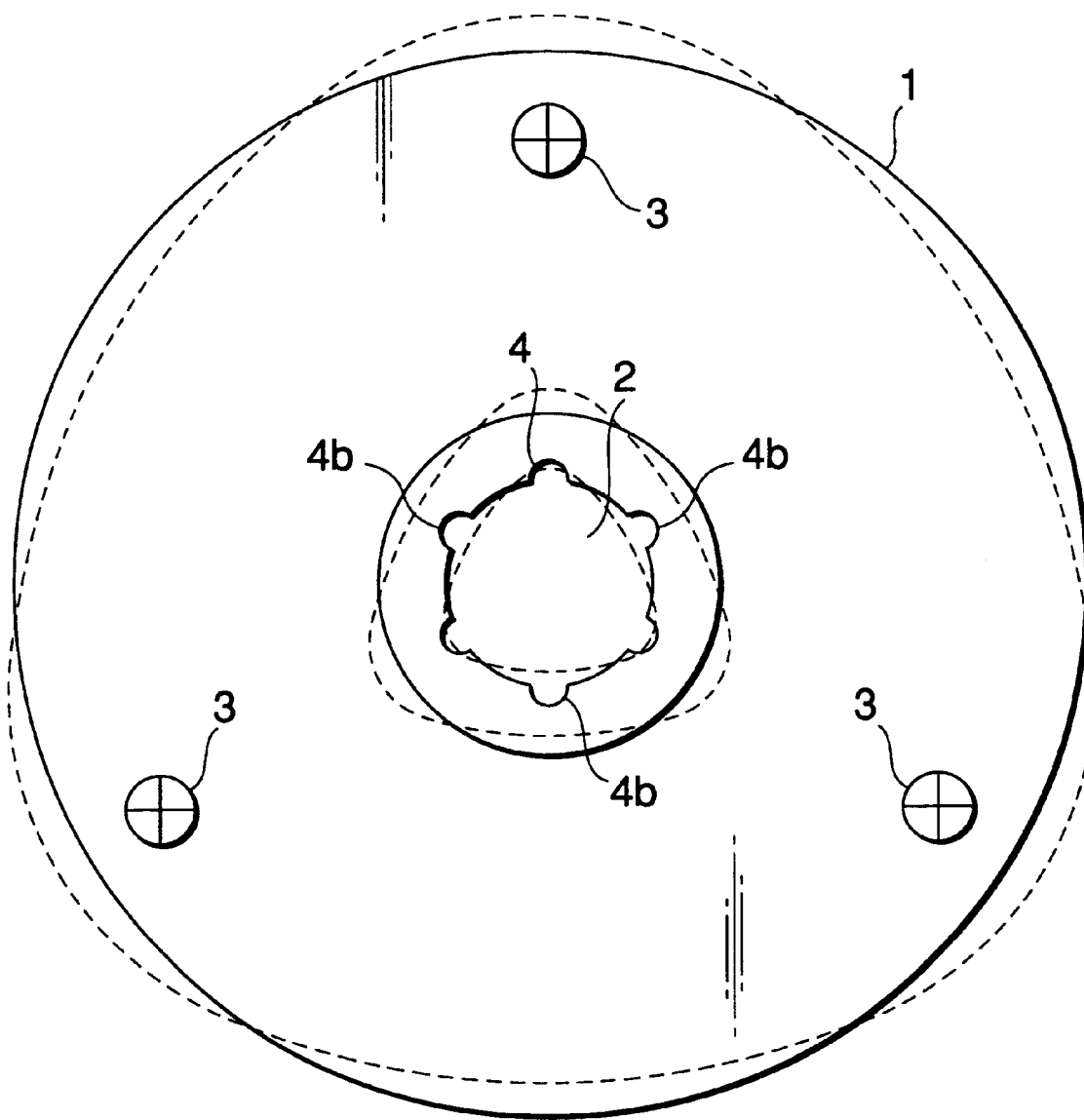
FIG. 6 is a front view of an input disc with which the three power rollers shown in FIG. 4 can be contacted, showing an embodiment of the input disc in which six spline grooves are formed.

Also, FIG. 2 shows another embodiment of an input disc employed in a ball spline for use in a troidal-type continuously variable transmission according to the invention, in which there are formed spline grooves used to constitute spline gaps. In the present input disc, similarly to FIG. 4, the three power rollers are respectively contacted with the upper side, lower left side, and lower right side contact points 3 of the input disc 1. Also, in the inner wall surface of the mounting hole 2 of the input disc 1, there are formed four spline grooves in such a manner that they are spaced at regular intervals from one another. In this embodiment as well, when the input disc is deformed due to a pressing force from the power rollers and is thereby turned from such a complete circular shape as shown by a solid line in FIG. 2 to an elliptic shape which is long from side to side as shown by a dotted line, the spline gap, which is allowed to overlap with the phase of the input disc 1 where the inside diameter of the mounting hole 2 is reduced most greatly, is only the spline gap that is constituted by the lower side spline groove 4a.

By the way, in the above-mentioned embodiments, description has been given hereinbefore of the combination of the two power rollers with the three spline grooves and the combination of the three power rollers with the four spline grooves. However, the invention is not always limited to these combinations. For example, if two, three, or four power rollers are combined with five spline grooves, it is also possible to structure a ball spline for use in a troidal-type continuously variable transmission according to the invention.

Figure 7:
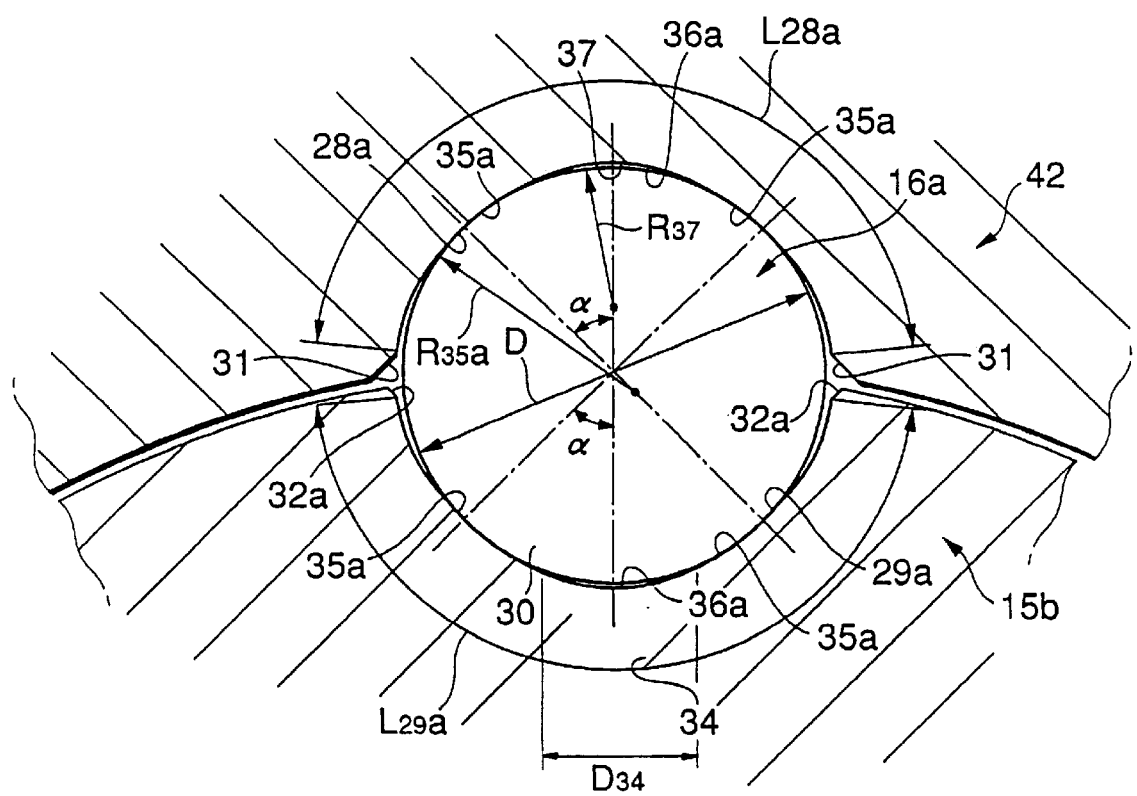
FIG. 7 is an enlarged view of the main portions of an embodiment of a troidal-type continuously variable transmission according to the invention, similar to FIG. 12.
Figure 8:
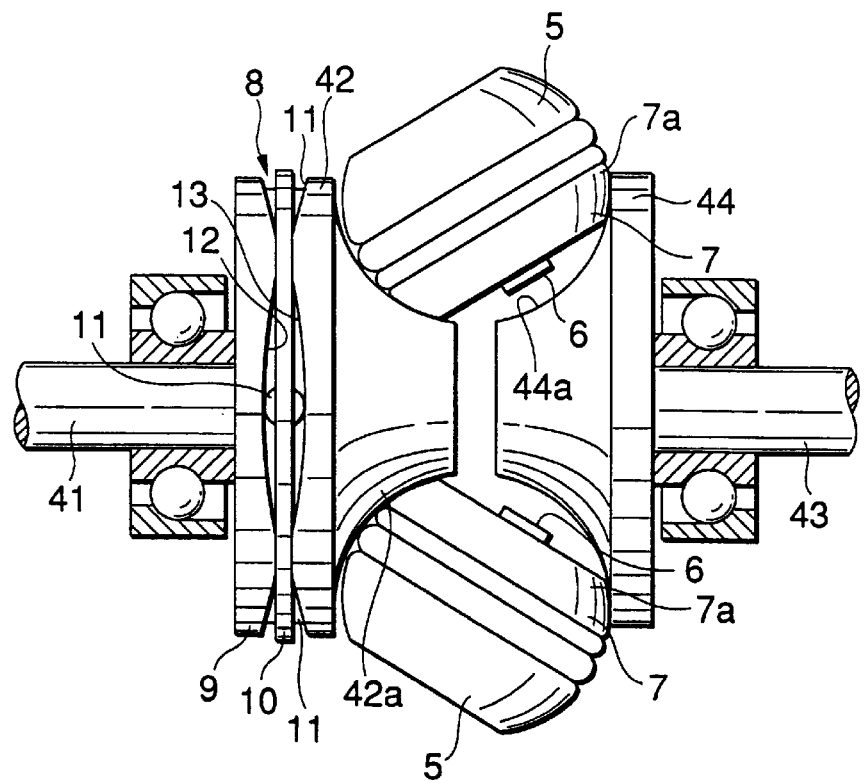
FIG. 8 is a side view of the basic structure of the troidal-type continuously variable transmission, showing the maximum decelerating state thereof.
Figure 9:
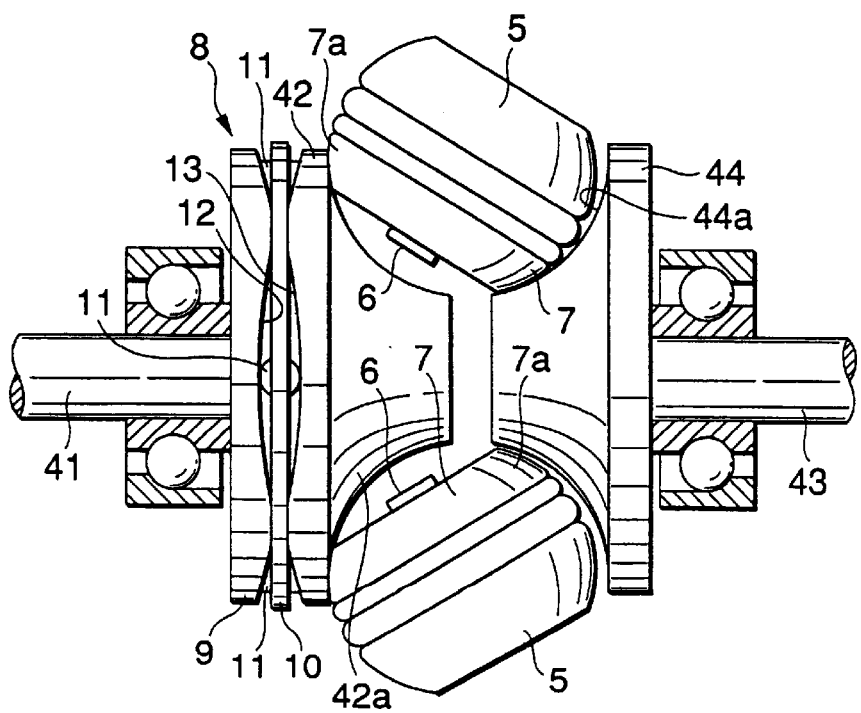
FIG. 9 is a side view of the basic structure of the troidal-type continuously variable transmission, showing the maximum accelerating state thereof.
Figure 10:
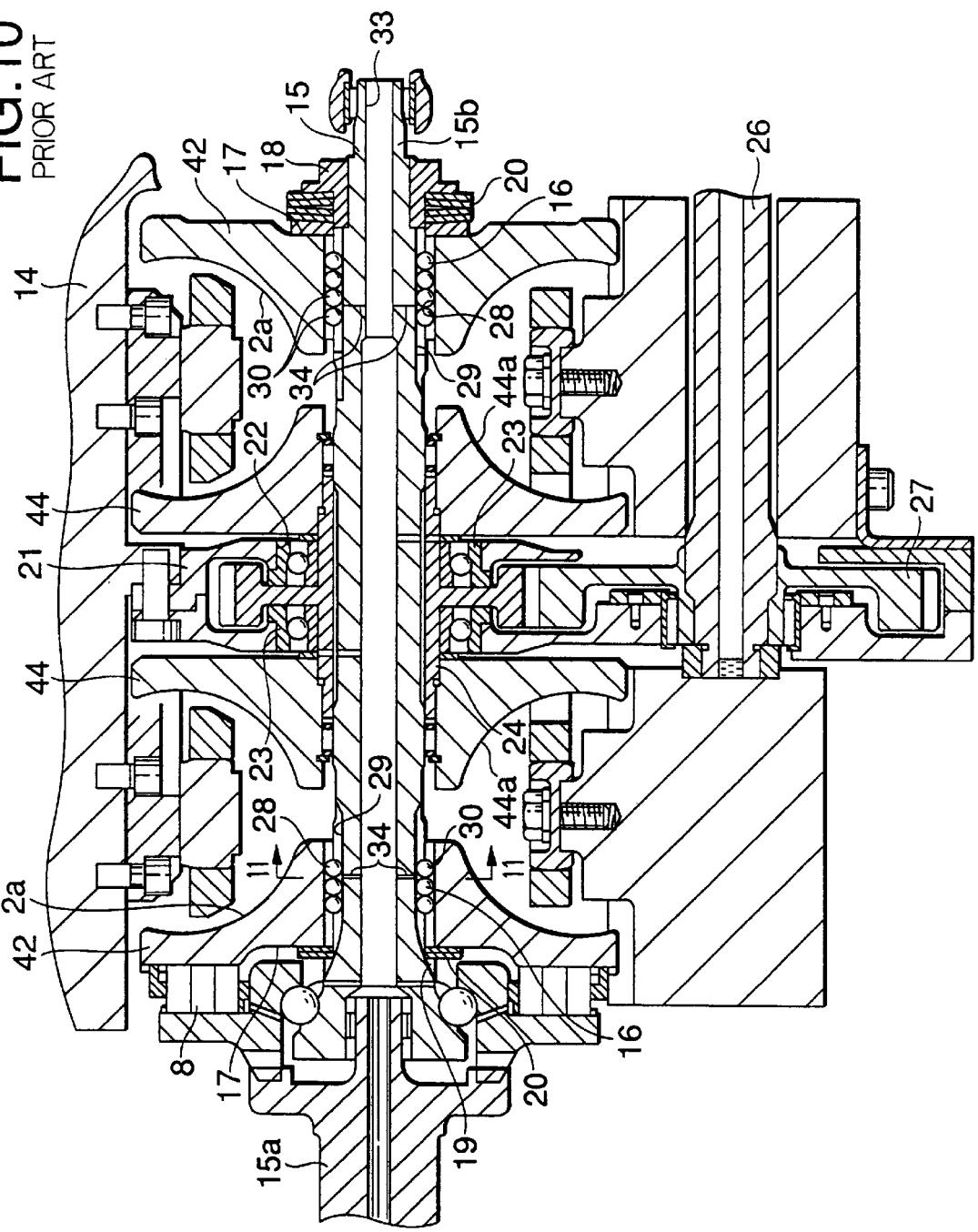
FIG. 10 is a section view of a conventional troidal-type continuously variable transmission.
Figure 11:
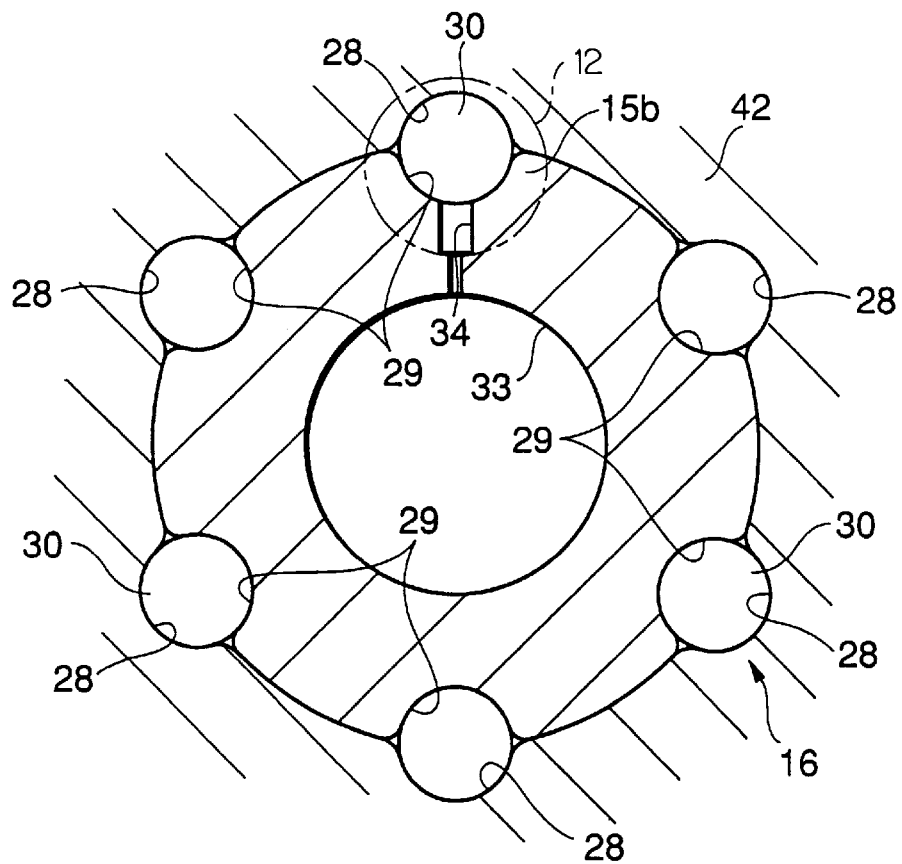
FIG. 11 is an enlarged section view taken along the line 11—11 shown in FIG. 10.

Next, FIG. 7 shows a still another embodiment of a troidal-type continuously variable transmission according to the present invention. By the way, the present invention is characterized in that a ball spline 16a, which is interposed between the outer peripheral surface of a rotary shaft such as the rear half section 15b of an input shaft 15 or the like and the inner peripheral surface of an input disc 42, is improved in structure to thereby be able to not only secure a transmission torque but also enhance the durability of the troidal-type continuously variable transmission. The remaining portions of the present invention are similar in structure and operation to the above-mentioned conventional troidal-type continuously variable transmission. Therefore, the duplicate illustration and description thereof are omitted or simplified here and description will be given below mainly of the characteristic portion of the present invention.

To structure the ball spline 16a, there is formed an inner peripheral surface side spline groove 28a in the inner peripheral surface of the input disc 42, while there is formed an outer peripheral surface side spline groove 29a in the outer peripheral surface of the rear half section 15b of the input shaft 15. The two spline grooves 28a and 29a are respectively formed in such a manner that their respective two circumferential-direction inner surfaces provide side surface portion arc surfaces 35a and 35a each having a larger radius of curvature $R_{35a}$ than the radius of curvature (D/2) of a ball 30 forming the ball spline 16a. On the other hand, the groove bottom portions 36a of the two spline grooves 28a and 29a are respectively formed as groove bottom portion arc surfaces 37 each having a smaller radius of curvature $R_{37}$ than the radius of curvature of the rolling surface of the ball 30. Therefore, the two spline grooves 28a and 29a each has a section of a Gothic arch shape.

The radius of curvature $R_{35a}$ of each of the side surface portion arc surfaces 35a and 35a is set in the range of 52–57% {$R_{35a}$=(0.52–0.57)D} of the outside diameter D of the ball 30. Also, the center point of the radius of curvature of the section of the respective side surface portion arc surfaces 35a and 35a is controlled so that the contact angle α between the respective side surface portion arc surfaces 35a and 35a and the ball 30 can be set in the range of 30–60 degrees. On the other hand, the radius of curvature $R_{37}$ of each of the groove bottom portion arc surfaces 37 is set 0.15 or more times the outside diameter D of the ball 30. However, the radius of curvature $R_{37}$ of each of the groove bottom portion arc surfaces 37 is also set less than ½ of the outside diameter D of the ball 30 (that is, the radius of curvature $R_{37}$ is set: $0.15D \leq R_{37} < D/2$).

As described above, since the radius of curvature $R_{37}$ of each of the groove bottom portion arc surfaces 37 respectively forming the groove bottom portions 36a of the inner peripheral surface side spline groove 28a and outer peripheral surface side spline groove 29a is set 0.15 or more times the outside diameter D of the ball 30, stresses are difficult to be concentrated on the groove bottom portions 36a . Therefore, due to a pressing force applied from the ball 30 onto the respective inner surfaces of the inner peripheral surface side spline groove 28a and outer peripheral surface side spline groove 29a, in more particular, due to the pressing force applied onto the respective side surface portion arc surfaces 35a and 35a of the spline grooves 28a and 29a, a damage such as a crack or the like becomes hard to occur in the groove bottom portions 36a regardless of tensile forces which are applied to the groove bottom portions 36a of the spline grooves 28a and 29a.

Further, after the groove bottom portions 36a are heat-treated, the heat-treated abnormal layers of the surfaces of the groove bottom portions 36a are removed therefrom. That is, the inner peripheral surface of the input disc 42 and the outer peripheral surface of the rear half section 15b are heat-treated for hardening in order to enhance the durability thereof. Through execution of such heat treatment, there are produced heat-treated abnormal layers in the surface portion of the inner peripheral surface of the input disc 42 and in the surface portion of the outer peripheral surface of the rear half section 15b respectively. If such heat-treated abnormal layers are present in the surface portions of the groove bottom portions 36a to which a great force is applied during operation of the troidal-type continuously variable transmission, a damage such as a crack or the like is easy to occur in the groove bottom portions 36a. On the other hand, according to the present embodiment, because the heat-treated abnormal layers are removed from the surface portions of the groove bottom portions 36a, the occurrence of such damage can be prevented.

Now, in Table 1, there are shown the results of a durability test which has been done in order to know what influences the size of the radius of curvature $R_{37}$ of the section of the groove bottom portion arc surface 37 and the presence or absence of the heat-treated abnormal layers have on the durability of the ball spline portion of the troidal-type continuously variable transmission. In this durability test, the outside diameter of the ball forming the ball spline was set 5.5 mm. Therefore, 15% of the outside diameter of the ball is equivalent to 0.825 mm. And, the remaining conditions than the radius of curvature $R_{37}$ of the section of the groove bottom portion arc surface 37 and the presence or absence of the heat-treated abnormal layers were the same over all of the test cases.

TABLE 1

| Sample No. | R37 | Presence or absence of heat-treated abnormal layers | Test result | Judgement |
|---|---|---|---|---|
| 1 | 0.5 mm | Absence | Broken after passage of 111 hrs | x |
| 2 | 0.5 mm | Absence | Broken after passage of 198 hrs | x |
| 3 | 0.9 mm | Absence | Through operation up to 250 hrs, nothing unusual | o |
| 4 | 0.9 mm | Presence | Broken after passage of 98 hrs | x |
| 5 | 1.0 mm | Absence | Through operation up to 250 hrs, nothing unusual | o |
| 6 | 1.0 mm | Presence | Broken after passage of 105 hrs | x |
| 7 | 1.5 mm | Presence | Broken after passage of 129 hrs | x |

As can be seen clearly from Table 1 showing the results of the durability test, if the radius of curvature $R_{37}$ of the section of the groove bottom portion arc surface 37 is set more than or equal to 15% of the outside diameter D of the ball 30 and the heat-treated abnormal layers are removed from the surface portions of the groove bottom portions 36a, then the durability of the ball spline 16a portion can be enhanced.

Further, according to the present embodiment, in the respective opening edges of the two circumferential-direction ends of the inner peripheral surface side spline groove 28a, there are respectively formed inner peripheral surface side chamfers 31 and 31; and, similarly, in the respective opening edges of the two circumferential-direction ends of the outer peripheral surface side spline groove 29a, there are respectively formed outer peripheral surface side chamfers 32a and 32a. Especially, in the troidal-type continuously variable transmission according to the invention, the outer peripheral surface side chamfers 32a and 32a are formed smaller than the inner peripheral surface side chamfers 31 and 31.

Figure 12:
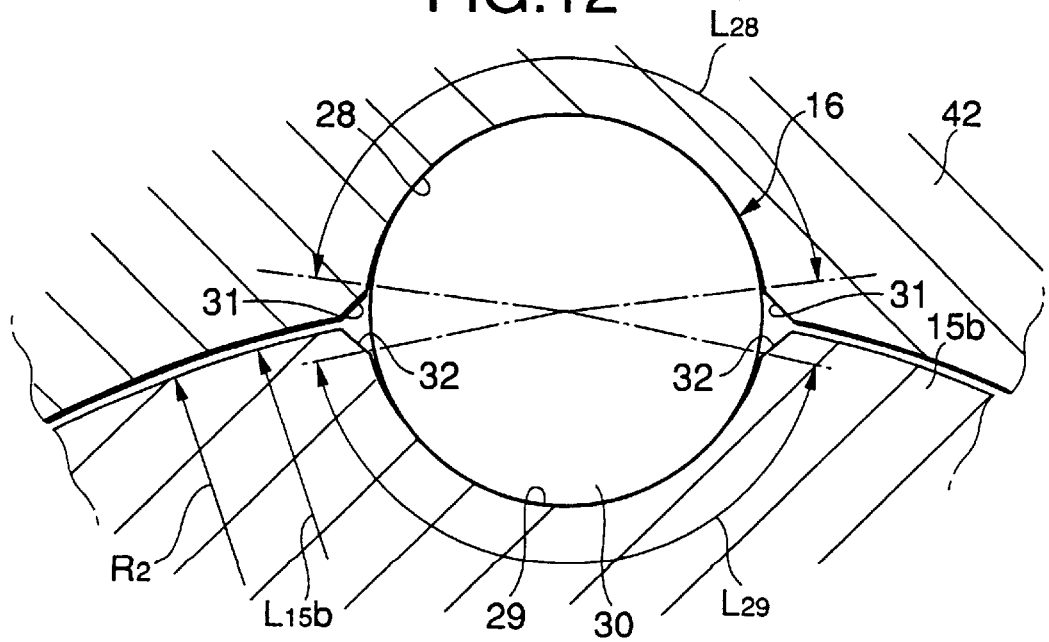
FIG. 12 is an enlarged view of the area 12 shown in FIG. 11.
Figure 13:
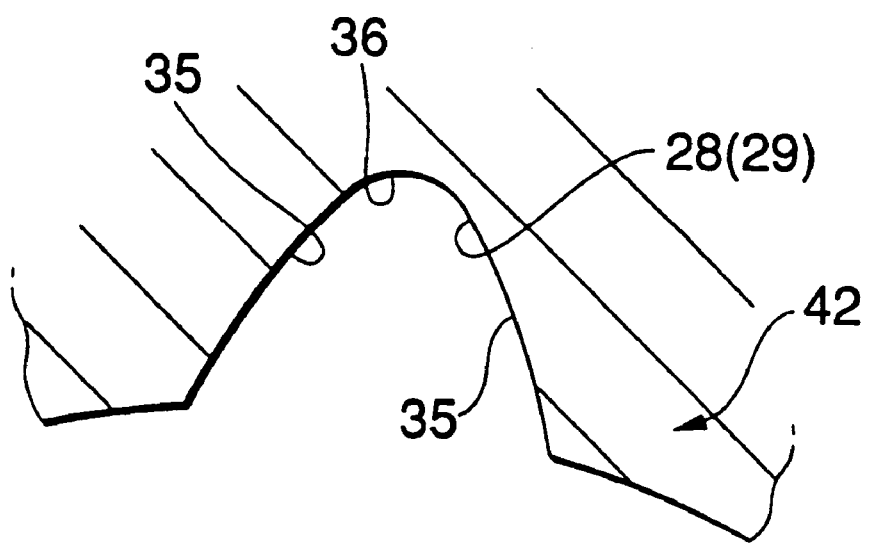
FIG. 13 is a section view similar to FIG. 12, showing the shape of a spline groove section in an exaggerated manner.

By an amount corresponding to the degree that the outer peripheral surface side chamfers 32a and 32a are formed smaller than the inner peripheral surface side chamfers 31 and 31, it is possible to secure a length $L_{29a}$ which is the peripheral-direction length of the section of the effective grinding surface of the outer peripheral surface side spline groove 29a. That is, in the case of the previously described conventional structure, as shown in FIG. 12, the peripheral-direction length $L_{29}$ of the section of the effective grinding surface of the outer peripheral surface side spline groove 29 is smaller than the peripheral-direction length $L_{28}$ of the section of the effective grinding surface of the inner peripheral surface side spline groove 28 (that is, $L_{29a} < L_{28}$). On the other hand, according to the invention, the peripheral-direction length $L_{29a}$ of the section of the effective grinding surface of the outer peripheral surface side spline groove 29a can be set equal to the peripheral-direction length $L_{28a}$ of the section of the effective grinding surface of the inner peripheral surface side spline groove 28a ($L_{29a} = L_{28a}$).

Since there can be secured the peripheral-direction length $L_{29a}$ of the section of the effective grinding surface of the outer peripheral surface side spline groove 29a in the above-mentioned manner, even if, to secure the contact angle a between the outer peripheral surface side spline groove 29a and the ball 30, the rolling surface of the ball 30 is contacted with the near-to-opening portion of the side surface portion arc surface 35a forming the outer peripheral surface side spline groove 29a to thereby secure the necessary size of the contact ellipse of the contact portion between the side surface portion arc surface 35a and the rolling surface of the ball 30, there is no fear that the present contact ellipse can reach the above-mentioned outer peripheral surface side chamfer 32a. That is, it is possible to surely prevent the possibility that the present contact ellipse can reach the above-mentioned outer peripheral surface side chamfer 32a to thereby apply an edge load to the rolling surface of the ball 30. As a result of this, the above-mentioned contact angle and the size of the contact ellipse can be secured, thereby being able to secure the rolling fatigue life between the side surface portion arc surface 35a and the rolling surface of the ball 30. And, the rolling fatigue life between the side surface portion arc surface 35a forming the inner surface of the inner peripheral surface side spline groove 28a and the rolling surface of the ball 30 can also be secured similarly to the outer peripheral surface side spline groove 29a.

By the way, while the downstream end of the branch oil supply passage 34 is opened in the groove bottom portion 36a of the outer peripheral surface side spline groove 29a, the inside diameter $D_{34}$ of the opening is set substantially equal to the order of the radius of curvature $R_{37}$ of the section of the groove bottom portion arc surface 37 forming the groove bottom portion 36a ($D_{34} \approx R_{37}$). Also, there is no special limit to a method for forming the two inner and outer peripheral surface side spline grooves 28a and 29a but, as an example, there can be expected a method in which the general shapes of the grooves to be formed are formed using an L machining operation (cutting operation) such as a broaching operation or the like, or using plastic working such as forging or the like, the thus formed general shapes are then heat-treated, and, after then, a G machining operation (grinding) or an L3 machining operation (cutting operation) is performed on the heat-treated shapes. In the execution of the G machining operation, there is used a forming grindstone having a shape which conforms to the section shapes of the inner and outer peripheral surface side spline grooves 28a and 29a. Also, by pulling out a hard broach after completion of the HT (heat treatment), the two inner and outer peripheral surface side spline grooves 28a and 29a can be finished. Use of such hard broach can reduce the working costs of the two inner and outer peripheral surface side spline grooves 28a and 29a.

As has been described heretofore, with use of a ball spline for use in a troidal-type continuously variable transmission according to the invention, even when the input disc is deformed due to the pressing force applied from the power rollers, the number of spline gaps in which the greatest loads are applied to the lines of balls can be reduced when compared with the conventional ball spline, which makes it possible to keep the transmission efficiency of the troidal-type continuously variable transmission at a high level. Also, because the balls become difficult to produce the impressions on the spline grooves and roll up onto the spline grooves, the breakage ratio of the ball spline can be lowered.

Further, in the ball spline of the troidal-type continuously variable transmission according to the invention, since the loads to be applied to the respective spline grooves can be equalized, not only the number of spline gaps can be reduced but also the number of balls to be arranged within each spline gap can be reduced. Thanks to this, the whole troidal-type continuously variable transmission can be reduced in size and weight and, at the same time, the costs necessary for production and maintenance of the ball spline and thus troidal-type continuously variable transmission can also be reduced.

Still further, since the present invention has the above-mentioned structure and operation, the present invention can contribute to realizing a high-performance troidal-type continuously variable transmission which can not only secure a transmission torque but also enhance the durability thereof.

What is claimed is:

1. A ball spline for use in a troidal-type continuously variable transmission, comprising:
    a plurality of spline grooves respectively formed in an outer peripheral surface of an input shaft and in an inner wall surface of a mounting hole opened up in a central portion of an input disc in such a manner that they extend along a direction of said input shaft and are opposed to each other, thereby forming spline gaps by two mutually opposing spline grooves respectively formed in the outer peripheral surface of the input shaft and in the inner wall surface of the mounting hole of said spline grooves; and
    a plurality of balls arranged in series within said spline gaps, wherein, while allowing a movement of said input disc in the direction of said input shaft by means of contact between said spline gaps and said balls, said input shaft and said input disc are drivingly connected to each other,
    wherein the number of said spline gaps is set different from integral multiples of the number of power rollers which are held by and between said input disc and an output disc in contact with said two discs in order to transmit a rotation torque between said input and output discs.

2. A ball spline for use in a troidal-type continuously variable transmission according to claim 1, wherein the number of said spline gaps and the number of said power rollers are mutually prime to each other.

3. A ball spline for a troidal-type continuously variable transmission, wherein a disc is supported through a said ball spline on an outer peripheral surface of a rotary shaft so as to be freely shifted in an axial direction of the rotary shaft, said ball spline comprising:
    a plurality of first spline grooves respectively formed in an inner peripheral surface of the disc;
    a plurality of second spline grooves respectively formed in the outer peripheral surface of the rotary shaft, wherein said first spline grooves and said second spline grooves respectively extend along a direction of said rotary shaft and are opposed to each other respectively, thereby forming a plurality of spline gaps; and
    a plurality of balls arranged in series within said spline gaps,
    wherein said first spline groove comprises:
        two side surface arc portions respectively formed on two circumferential-direction inner surfaces of said first spline groove, each of said side surface arc portions having a larger radius of curvature than a radius of curvature of a rolling surface of said ball;
        a bottom arc surfaces formed on a bottom portion of said first spline groove,
        wherein said bottom arc surface has a radius of curvature which is smaller than the radius of curvature of the rolling surface of said ball and is 0.15 or more times an outside diameter of said ball, so that said first spline groove has a cross section of a Gothic arch shape, and after execution of heat-treatment on said first spline groove, a heat-treated abnormal layer are removed from a surface of each of said bottom portion of said first spline groove.

4. A ball spline for a troidal-type continuously variable transmission according to claim 3, wherein a radius of curvature of said side surface arc portion is set in a range of 52–57% of the outside diameter of said ball.

5. A ball spline for a troidal-type continuously variable transmission, wherein a disc is supported through a said ball spline on an outer peripheral surface of a rotary shaft so as to be freely shifted in an axial direction of the rotary shaft, said ball spline comprising:
    a plurality of first spline grooves respectively formed in an inner peripheral surface of the disc, each of said first spline grooves having two first chamfers respectively formed in circumferential-direction two end opening edge portions of said first spline groove;
    a plurality of second spline grooves respectively formed in the outer peripheral surface of the rotary shaft, each of said second spline grooves having two second chamfers respectively formed in circumferential-direction two end opening edge portions of said second spline groove, wherein said first spline glooves and said second spline grooves respectively extend along a direction of said rotary shaft and are opposed to each other respectively, thereby forming a plurality of spline gaps; and
    a plurality of balls arranged in series within said spline gaps,
    wherein said second chamfers are set smaller than said first chamfers.

6. A troidal-type continuously variable transmission comprising:
    an input shaft
    an input disc supported by said input shaft;
    an output shaft;
    an output disc coupled to said output shaft, wherein said input disc and said output disc respectively have a concave surface formed on an axial-direction one-side surface having a cross section of an arc shape, and said two discs can be freely rotated coaxially with and independently of each other with said respective concave surfaces being opposed to each other;
    a pair of trunnions swingable about pivots respectively situated at twisted positions with respect to a center of rotation of said two discs;
    a plurality of power rollers respectively interposed between said concave surfaces of said two discs, supported rotatably on shift shafts respectively, and each of said power rollers including a peripheral surface as a rotation-arc-surface shaped convex surface; and a ball spline for supporting said input disc on an outer peripheral surface of said input shaft so that said input disc can be freely shifted in an axial direction of said input shaft, said ball spline comprising:

a plurality of spline grooves respectively formed in the outer peripheral surface of said input shaft and in an inner wall surface of a mounting hole opened up in a central portion of said input disc in such a manner that they extend along a direction of said input shaft and are opposed to each other, thereby forming spline gaps by two mutually opposing spline grooves respectively formed in the outer peripheral surface of said input shaft and in the inner wall surface of the mounting hole of said spline grooves; and a plurality of balls arranged in series within said spline gaps, wherein, while allowing a movement of said input disc in the direction of said input shaft by means of contact between said spline gaps and said balls, said input shaft and said input disc are drivingly connected to each other, wherein the number of said spline gaps is set different from integral multiples of the number of power rollers which are held by and between said input disc and an output disc in contact with said two discs in order to transmit a rotation torque between said input and output discs.

7. A troidal-type continuously variable transmission according to claim 6, wherein the number of said spline gaps and the number of said power rollers are mutually prime to each other.

8. A troidal-type continuously variable transmission comprising:

an input shaft an input disc supported by said input shaft;

an output shaft;

an output disc coupled to said output shaft, wherein said input disc and said output disc respectively have a concave surface formed on an axial-direction one-side surface having a cross section of an arc shape, and said two discs can be freely rotated coaxially with and independently of each other with said respective concave surfaces being opposed to each other;

a pair of trunnions swingable about pivots respectively situated at twisted positions with respect to a center of rotation of said two discs;

a plurality of power rollers respectively interposed between said concave surfaces of said two discs, supported rotatably on shift shafts respectively, and each of said power rollers including a peripheral surface as a rotation-arc-surface shaped convex surface; and a ball spline for supporting said input disc on an outer peripheral surface of said input shaft so that said input disc can be freely shifted in an axial direction of said input shaft, said ball spline comprising:

a plurality of first spline grooves respectively formed in an inner peripheral surface of said input disc;

a plurality of second spline grooves respectively formed in the outer peripheral surface of said input shaft, wherein said first spline glooves and said second spline grooves respectively extend along the axial direction of said input shaft and are opposed to each other respectively, thereby forming a plurality of spline gaps; and a plurality of balls arranged in series within said spline gaps, wherein said first spline groove comprises:

two side surface arc portions respectively formed on two circumferential-direction inner surfaces of said first spline groove, each of said side surface arc portions having a larger radius of curvature than a radius of curvature of a rolling surface of said ball;

a bottom arc surfaces formed on a bottom portion of said first spline groove, wherein said bottom arc surface has a radius of curvature which is smaller than the radius of curvature of the rolling surface of said ball and is 0.15 or more times an outside diameter of said ball, so that said first spline groove has a cross section of a Gothic arch shape, and after execution of heat-treatment on said first spline groove, a heat-treated abnormal layer are removed from a surface of each of said bottom portion of said first spline groove.

9. A troidal-type continuously variable transmission according to claim 8, wherein a radius of curvature of said side surface arc portion is set in a range of 52–57% of the outside diameter of said ball.

10. A troidal-type continuously variable transmission comprising:

an input shaft an input disc supported by said input shaft;

an output shaft;

an output disc coupled to said output shaft, wherein said input disc and said output disc respectively have a concave surface formed on an axial-direction one-side surface having a cross section of an arc shape, and said two discs can be freely rotated coaxially with and independently of each other with said respective concave surfaces being opposed to each other;

a pair of trunnions swingable about pivots respectively situated at twisted positions with respect to a center of rotation of said two discs;

a plurality of power rollers respectively interposed between said concave surfaces of said two discs, supported rotatably on shift shafts respectively, and each of said power rollers including a peripheral surface as a rotation-arc-surface shaped convex surface; and a ball spline for supporting said input disc on an outer peripheral surface of said input shaft so that said input disc can be freely shifted in an axial direction of said input shaft, said ball spline comprising:

a plurality of first spline grooves respectively formed in an inner peripheral surface of said input disc, each of said first spline grooves having two first chamfers respectively formed in circumferential-direction two end opening edge portions of said first spline groove;

a plurality of second spline grooves respectively formed in the outer peripheral surface of said input shaft, each of said second spline grooves having two second chamfers respectively formed in circumferential-direction two end opening edge portions of said second spline groove, wherein said first spline glooves and said second spline grooves respectively extend along a direction of said rotary shaft and are opposed to each other respectively, thereby forming a plurality of spline gaps; and a plurality of balls arranged in series within said spline gaps, wherein said second chamfers are set smaller than said first chamfers.

* * * * *